United States Patent
Denny et al.

(10) Patent No.: US 6,330,686 B1
(45) Date of Patent: Dec. 11, 2001

(54) HANDLING PROTECTED CONVERSATION MESSAGES ACROSS IMS RESTART IN SHARED QUEUES ENVIRONMENT

(75) Inventors: George Steven Denny, San Jose; Gerald Dean Hughes, Morgan Hill; Michael Bruce Kennedy; Khiet Quang Nguyen, both of San Jose, all of CA (US)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 09/200,923

(22) Filed: Nov. 30, 1998

(51) Int. Cl.[7] ........................................... G06F 11/00
(52) U.S. Cl. .................................. 714/4; 709/248
(58) Field of Search .................... 714/4, 5, 7, 8, 714/11, 12, 15, 25, 31, 39, 42, 38; 712/32, 227; 709/201, 248

(56) References Cited

U.S. PATENT DOCUMENTS

| | | | |
|---|---|---|---|
| 5,165,031 | * 11/1992 | Pruul et al. ............................. | 714/25 |
| 5,319,773 | * 6/1994 | Britton et al. .......................... | 714/15 |
| 5,319,774 | 6/1994 | Ainsworth et al. ..................... | 714/20 |
| 5,363,505 | * 11/1994 | Maslak et al. ......................... | 709/100 |
| 5,410,684 | * 4/1995 | Ainsworth et al. .................... | 714/18 |
| 5,463,736 | 10/1995 | Elko et al. .............................. | 710/28 |
| 5,561,797 | * 10/1996 | Gilles et al. ............................ | 707/8 |
| 5,561,809 | 10/1996 | Elko et al. .............................. | 709/213 |
| 5,649,185 | 7/1997 | Antognini et al. ..................... | 707/9 |
| 5,706,432 | 1/1998 | Elko et al. .............................. | 709/213 |
| 5,854,750 | * 12/1998 | Phillips et al. ......................... | 364/478.04 |
| 5,884,327 | * 3/1999 | Cotner et al. .......................... | 707/202 |
| 6,185,699 | * 2/2001 | Haderle et al. ........................ | 714/19 |

* cited by examiner

Primary Examiner—Nadeem Iqbal
(74) Attorney, Agent, or Firm—Sughrue, Mion, Zinn, Macpeak & Seas, PLLC

(57) ABSTRACT

During phase one of each protected conversation transaction, one or more messages are inserted. These messages are logged for recoverability. IMS system could crash before phase two of commit. When IMS restarted and eventually reached phase 2, it could vote to abort or commit the conversation. During IMS restart, the retry logic is used to put all protected conversation messages out to central facility with a specification that the first message segment be put on the staging queue using the recovery token as the queue name. If it is an abort request, all messages under the same commit scope identified by the recovery token, will be deleted. If it is a commit request, the first segment of all messages under the same commit scope will be moved to its appropriate ready queue with its actual queue name.

10 Claims, 2 Drawing Sheets

HANDLING PROTECTED CONVERSATION MESSAGES ACROSS IMS RESTART IN SHARED QUEUES ENVIRONMENT

This patent application is related to the following U.S. patent documents:

U.S. Pat. No. 5,410,684, entitled "LOG NAME EXCHANGE FOR RECOVERY OF PROTECTED RESOURCES" filed Sep. 20, 1993 by M. K. Ainsworth et al, continuation of Ser. No. 525,430 filed May 16, 1990;

U.S. Pat. No. 5,363,505, entitled "LOCAL AND GLOBAL COMMIT SCOPES TAILORED TO WORK UNITS" filed Jun. 9, 1993 by B. A. M. Maslak et al, continuation of Ser. No. 525,426 filed May 16, 1990;

U.S. Pat. No. 5,319,774, entitled "RECOVERY FACILITY FOR INCOMPLETE SYNC POINTS FOR DISTRIBUTED APPLICATION" filed May 16, 1990 by M. K. Ainsworth et al;

U.S. Pat. No. 5,436,736, entitled "COUPLING FACILITY FOR RECEIVING COMMANDS FROM PLURALITY OF HOSTS FOR ACTIVATING SELECTED CONNECTION PATHS TO I/O DEVICES AND MAINTAINING STATUS THEREOF" filed Oct. 18, 1994 by D. A. Elko et al;

U.S. Pat. No. 5,706,432, entitled "MECHANISM FOR RECEIVING MESSAGES AT A COUPLING FACILITY" filed Jun. 7, 1995 by D. A. Elko et al;

U.S. Pat. No. 5,561,809, entitled "IN A MULTIPROCESSING SYSTEM HAVING A COUPLING FACILITY, COMMUNICATING MESSAGES BETWEEN THE PROCESSORS AND THE COUPLING FACILITY IN EITHER A SYNCHRONOUS OPERATION OR AN ASYNCHRONOUS OPERATION" filed Apr. 11, 1995 by D. A. Elko et al.

The above listed patents and the present application are owned by one and the same assignee, International Business Machines Corporation of Armonk, N.Y., and are incorporated herein by reference.

I. DESCRIPTION OF THE INVENTION

IA. Field of the Invention

This invention relates to computer operating systems. More specifically, this invention relates to techniques for handling all types of IMS messages including protected conversations between two processes in the same or different execution environments after a corresponding IMS system crashes during phase one of a commit procedure.

The invention is embodied in an apparatus and method for handling messages by either committing corresponding messages after restart of the IMS system or aborting the commit procedure altogether.

IB. Background of the Invention

The present invention can be used in a network of computer systems that form part of a distributed computer system. Such a distributed computer system typically includes a central host computer and a plurality of virtual machines or other types of execution environments. A real machine includes a central processor and associated virtual machines. Within each such real machine a central computer, that includes the central processor, manages central resources of the real machine including a large memory and communication facilities. The central processor controls the access between the virtual machines and the resources so that each virtual machine appears to be a separate computer. The real machines may in turn be interconnected through a network into a global network to enable communications between applications running in execution environments belonging to different real machines. Each virtual machine is provided with its own conversation monitor system (CMS) to interact with (i.e., receive instructions from and provide prompts for) users of the virtual machine. CMS is a portion of the system control program. Certain resources such as shared file system (SFS) and shared structured query language (SQL) relational databases may be accessed by any user of the virtual machine and the host.

Each such system is a real machine. Two or more real machines can be connected to form a network, and data can be transferred using communications between virtual machines belonging to different real machines. Such a transfer is made via communication facilities such as AVS Gateway and VTAM facilities ("AVS Gateway and VTAM" are trademarks of IBM Corp. of Armonk, N.Y.).

Application running on any of the virtual machines may communicate with the coupling facility as well as with other applications running on the same or different virtual machines. Applications communicate by sending a message to the coupling facility. Like files and databases, communications are also protected resources.

An application can make changes to a database, file resource, or state of communication by first making a work request defining the changes. In response to a request for a change, provisional changes are made in shadow files while the original database or file is unchanged. When changes are made to shadow files, they are not committed. The application have the option of requesting that the changes be committed to validate the shadow file changes. Thereby, the changes made to the shadow file is transferred to the original file.

A one-phase commit procedure is often utilized to commit changes to the original file. The one-phase commit procedure consists of a command to commit changes to the resource as contained in the shadow file. When resources such as SFS or SQL resources are changed, the commits to the resources can be completed in separate one-phase commit procedures. In the vast majority of cases, all resources will be committed using separate procedures without error or interruption. However, if a problem arises during a one-phase commit procedure, some of the separate commits may have already been completed while others may not, causing inconsistencies. Such a problem can be solved only by rebuilding resources. However, the cost of rebuilding non-critical resources is more than compensated by the improved efficiency of the one-phase commit procedure.

A two-phase commit procedure is required to protect critical resources and critical communications. For example, assume that a first person's checking account is represented in a first database and a second person's savings account is represented in a second database. If the first person writes a check to the second person and the second person deposits the check in his/her savings account, the two-phase commit procedure ensures that if the first person's checking account is debited then the second person's savings account is credited or else neither account is changed. The checking and savings accounts are considered protected, critical resources because it is very important that data transfers involving the checking and savings accounts be handled reliably.

An application program can perform the two-phase commit procedure using a single command. Such a procedure consists of the following steps, or phases: During a prepare phase, each participant (debit and credit) resource is polled by the sync point manager to determine if the resource is ready to commit all changes. Each resource promises to complete the resource update if all resources successfully complete the prepare phase i.e. are ready to be updated. During the commit phase, the sync point manager directs all resources to finalize the updates or back them out if any resource could not complete the prepare phase successfully.

The above described two-phase commit procedure ensures consistency of modification of critical resources in most cases. It is possible, however, that a message sent by the application to the coupling facility (by executing the common queues system (CQS) PUT command) fails during the last stage of the commit procedure, when all the other participants of the protected conversation already committed changes. In such a case, the changes that have already been made can not be backed out because the protected resources are polled for readiness during the first phase of the commit procedure. This problem can be solved by retrying CQS PUT command for the failed message. If this retry succeeds, the consistency of the protected resources will be restored. However, the conventional techniques fail to provide a method for retrying CQS PUT procedure to restore consistency in the state of protected system resources.

II. SUMMARY OF THE INVENTION

It is therefore an object of this invention to provide a method for handling IMS messages including protected conversation messages across the IMS system restart.

Specifically, it is an objective of the present invention to provide a method for handling IMS messages including protected conversation messages across the IMS restart using corresponding unit of work elements.

It is another objective of the present invention to provide a system for handling IMS messages including protected conversation messages across the IMS system restart.

To achieve the objectives and the advantages of the present invention there is provided a distributed computer system comprising a plurality of execution environments and a coupling facility, wherein: each of said plurality of execution environments comprises a private storage memory for storing unit of work elements and a log data set for logging data related to the activity of each of said execution environments; and said coupling facility comprises a staging queue for storing messages that are not ready to be committed and a ready queue for storing messages that are ready to be committed.

Further improvements include the above distributed computer system wherein each of said stored unit of work elements comprises a recovery token containing information on all resources participating in a commit procedure.

Still further improvements include the above distributed computer system wherein each of said stored unit of work elements has an abort indicator, wherein the abort indicator indicates that a corresponding abort procedure is designated for abort when the abort indicator is set.

Still further improvements include the above distributed computer system wherein each of said stored unit of work elements has a commit indicator, wherein the commit indicator indicates that a corresponding commit procedure is designated for commit when the commit indicator is set.

Still further improvements include the above distributed computer system wherein each of said plurality of execution environments further comprises a retry logic, wherein said retry logic can be used to store unit of work elements and further said retry logic can be used for retrying putting protected conversation messages corresponding to each of said stored unit of work elements to said coupling facility.

Another aspect of the present invention is a distributed computer system wherein a protected conversation can be recovered after failure of an IMS system before phase two of a commit procedure, said system comprising: a restarting means for restarting the IMS system; a retry logic means for using retry logic to put all IMS messages out to a coupling facility such that a first message segment corresponding to each of said IMS messages is put on a staging queue using recovery token as a queue name; a voting means to select one of aborting and committing said IMS messages; a deleting means to deleting all messages under a same commit scope as identified by a recovery token if aborting has been selected; and a moving means for moving the first segment corresponding to each of said IMS under a same commit scope to a ready queue under its actual queue name if commit has been determined.

Another aspect of the present invention is a method for recovering a message after failure of the IMS system before phase two of a commit procedure, comprising: (a)restarting the IMS system; (b)using retry logic to put all messages out to a coupling facility such that a first message segment corresponding to each of said messages is put on a staging queue using recovery token as a queue name; (c) voting to select one of aborting and committing said message; (d) deleting all messages under the same commit scope as identified by a recovery token if aborting has been selected; (e)moving the first segment corresponding to each of said messages under a same commit scope to a ready queue under its actual queue name if commit has been determined.

Further improvements include the above method wherein step (d) further comprises: (i) deleting all data objects with a matching recovery token; (ii) scanning for a unit of work elements using the recovery token; (iii) setting said unit of work element to be released if said unit of work element is found.

Still further improvement include the above method wherein step (e) further comprises: (i) moving all data objects with a matching recovery token to appropriate ready queue; (ii) scanning for a unit of work elements using the recovery token; (iii) setting said unit of work element such that the message to be PUT directly to appropriate ready queue if said unit of work element is found.

Another aspect of the present invention is a computer program product for recovering a protected conversation after failure of an IMS system before phase two of a commit procedure in a distributed computer system, the computer program product including a computer readable medium comprising: a computer readable restart code; a computer readable retry code; a computer readable voting code; a computer readable deleting code; and a computer readable moving code, wherein the restarting code restarts the IMS system; wherein the retry code uses retry logic to put all IMS messages out to a coupling facility such that a first message segment corresponding to each of said IMS messages is put on a staging queue using recovery token as a queue name; wherein the voting code to selects one of aborting and committing said IMS messages; wherein the deleting code to deletes all messages under a same commit scope as identified by a recovery token if aborting has been selected; and wherein the moving code moves the first segment corresponding to each of said IMS under a same commit scope to a ready queue under its actual queue name if commit has been determined.

III. BRIEF DESCRIPTION OF THE DRAWINGS

The above objectives and advantages of the present invention will become more apparent by describing in detail preferred embodiments thereof with reference to the attached drawings in which.

IV. DETAILED DESCRIPTION OF THE INVENTION

Figure 1:
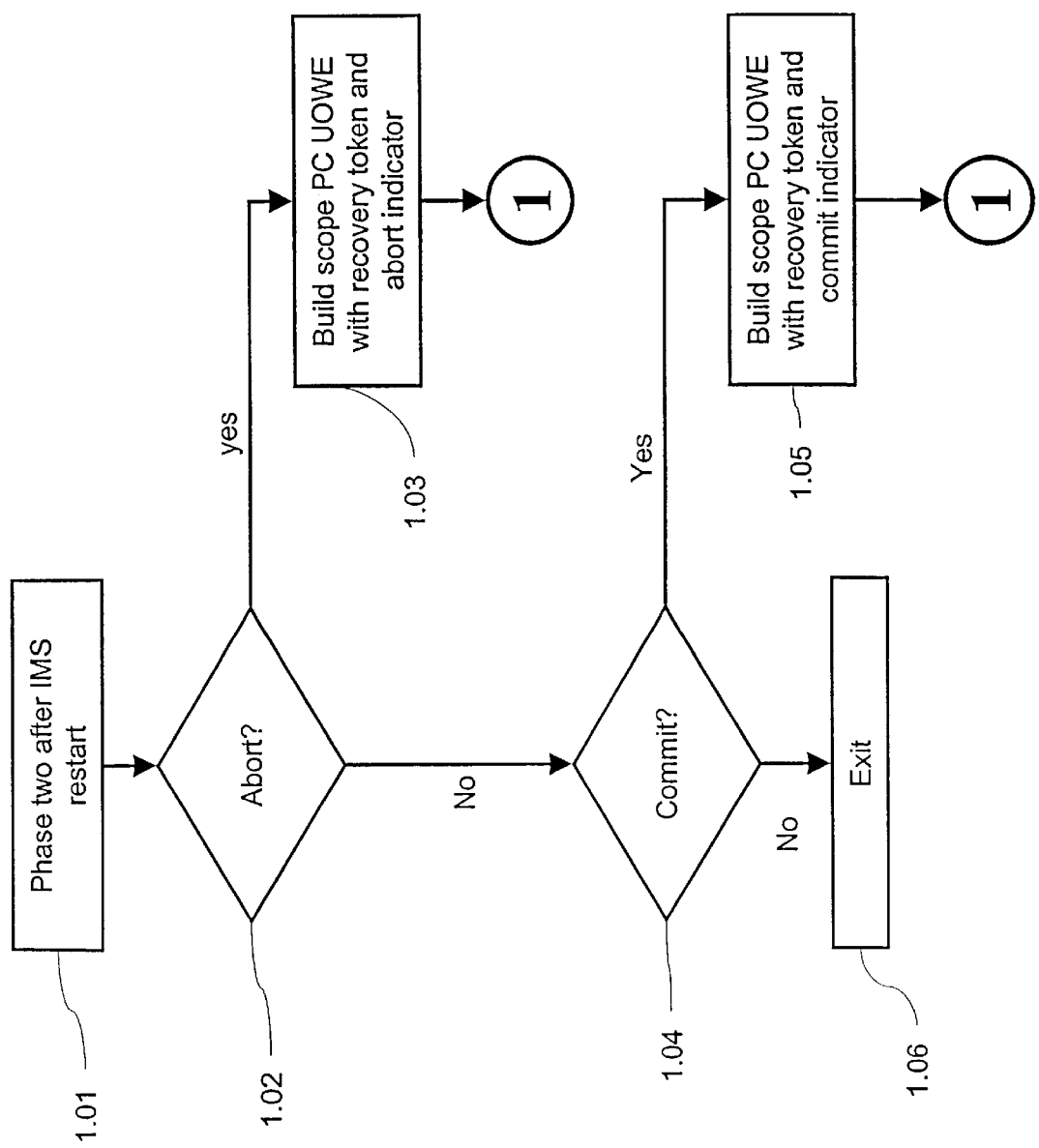
FIG. 1 illustrates the procedure for building scope unit of work element on the phase two of the protected conversation after IMS restart.

In the computer system of the present invention an application running in one of the plurality of execution environments can exchange messages with another application, running in the same or different execution environment of the same or different real machine. The application can also exchange messages with the coupling facility. It should be noted that though the preferred embodiments are described in terms of protected conversations, the scope of the present invention covers all IMS messages.

Synchronized message exchange between two applications or the application and the coupling facility, conducted using commit procedure is called a protected conversation. The participants of the protected conversation are called conversation partners. The protected conversation protocol ensures consistency in the communication procedure, wherein the message exchange between two participants in the conversation is synchronized using the commit procedure, described in detail below. In such conversation, each message includes a command and a response.

To send a message to its conversation partner, the application puts the message into the coupling facility. To facilitate message exchanges, the coupling facility includes a message facility which is used by applications in message exchanges.

IVA. Structure of the Distributed Computer System of the Present Invention

The distributed computer system of a preferred embodiment of the present invention includes a plurality of execution environments and a coupling facility. The above components form real machines. These real machines in turn may be interconnected using a network means. The execution environments may be based on central processing complexes (CPCs) running as IMS systems. The coupling facility facilitates information exchanges between the execution environments. This facility includes a message facility used by the execution environments in message exchanges.

Structure of the execution environments. The execution environments forming part of the distributed computer system invention includes a central processing complex (CPC) with a private memory for storing unit of work elements (UOWE). It also includes a log facility for logging the activity of applications running in the corresponding execution environments.

The log facility comprises an online log data set (OLDS) and a system log data set (SLDS). Log data sets contain data associated with messages written to the coupling facility. The current activity logs are stored in the OLDS. The activity logs are archived as and filled into system log data sets. The system log data set contains four generations of the online log data set. As a newer version of the online data set is archived, the oldest version stored in the system log data set is deleted.

Structure of the coupling facility. The coupling facility contains a message facility that is used in a shared manner by multiple applications. This message facility is used in facilitating communications between applications running on the same or different execution environments or an application and the coupling facility. The coupling facility also includes a common queues server (CQS) having a plurality of queues that are shared by the applications running on the execution environments coupled by the coupling facility.

A more detailed description of an embodiment of a multiprocessing system having a coupling facility and communicating messages between the processors and the coupling facility is described in aforementioned U.S. Pat. No. 5,561,809 and incorporated herein by reference.

IVB. Using Commit Procedure to Ensure Consistency in Modification of Protected Resources Using the protected conversations protocol in the message communication is described below. A detailed description of embodiments of this protocol may be found in U.S. Pat. Nos. 5,410,684; 5,363,505; and 5,319,774 which are incorporated herein by reference.

To synchronize and coordinate modifications to protected resources, such as protected files or protected conversations, special commit procedures are used. Typically a commit procedure has two phases: a polling or prepare phase and a back-out or commit phase. During the prepare phase a protected conversation manager polls the participants of the commit procedure to determine whether all the resources are ready to commit changes. Each resource promises to complete the resource update if all resources successfully complete their prepare phases i.e. are ready to be updated. During the commit phase, the sync point manager directs all resources to finalize the updates or back them out if any resource could not complete the prepare phase successfully.

IVC. Message Communications Via Protected Conversations Within Distributed Computer System Communications between processes (applications) running in the same or different execution environments can be carried out by different means including shared memory, messages, semaphores, remote procedure calls, etc. Protected conversations using messages is one of the interprocess communication modes. According to this mode, a process running in the first execution environment uses a coupling facility to write out a message. This writing out is synchronized with writing of a message by the other application participating in the conversation. The synchronization is accomplished through the use of a commit procedure. The same communication scheme may be used for communications between an application and the coupling facility.

IVD. Retrying Failed CQS PUT Requests

A message exchange according to the protected conversation protocol is accomplished in the following manner. For the purposes of the foregoing description the message facility wherein applications write messages constitutes a protected system resource, and is treated in the same manner as protected file or database. Therefore, a skilled artisan will realize that all these different forms of communications are within the scope of the present invention.

In the first stage of the protected conversation protocol, the participants of the protected conversation submit provisional changes. In practice such submission is accomplished by sending the entire message, except for the first segment of that message, to the coupling facility. After that, the two-phase commit procedure is invoked to ensure the consistency when committing the said changes. In the first phase of the commit procedure, the sync point manager polls the participants in the conversation to determine their readiness to commit the proposed changes. If all participants are ready to commit the changes, the sync point manager starts the second phase of the commit procedure by issuing all participating resources the request to commit the proposed changes. In response to the commit command of the sync point manager, the application issues a PUT command to put the message to the coupling facility.

When a message is being PUT into the coupling facility in the second stage, which is the last stage of commit procedure, the PUT command may fail for some reason. Such failure occurs, for example, due to a system crash. All the other participants of the conversation may have committed the changes, except for the present application, because during the first phase of the commit protocol the problem did not exist. This would create a situation where changes in the protected resources are inconsistent. In case when one of the participant of the protected conversation is a user terminal and the message from the other participant, an application, fails; the damage may be minimal. In such a case, the user may be asked by the system to repeat the input and the entire conversation is started from scratch.

On the other hand, when the response to the message by an application fails, it may not be always possible to signal to the application requesting repeat of the previous output. Therefore the use of the retry procedure which is trying to "save" conversation becomes important.

First, according to the protected conversation protocol, a unit of work element (UOWE) is created to represent a message which was put out to the coupling facility. The UOWE is a record stored in a private storage of the IMS system. The record includes the following information:

(1) a retry flag that indicates that the message corresponding to that UOWE failed and scheduled for retry;
(2) a log token that points to the log records of the log data set of the IMS system containing information about the content of the failed message;
(3) a unit of work identifier uniquely defining the scope of the changes in the system;
(4) disk relative record number pointing to the disk record containing data associated with the failed message.

When the retry flag is set, it signals to the conversation manager that given UOWE represents failed message designated for retry. The log token contains information identifying the log records containing information about the original message to be written to the coupling facility.

Second, the "retry" UOWE described above accumulate in the private storage of the IMS. The entries from this private storage are being read by the retry logic. After reading UOWE from the designated private storage, the retry logic analyzes every retry request and attempts to retry putting corresponding message into the coupling facility. This retry process will be described below.

On the first step the retry logic analyzes next UOWE from the queue. On the second step the retry logic extracts the log token from this UOWE. This log token identifies log records in the IMS log data set that store information on the failed message. Then the retry logic uses the extracted token to read a specific log record from the IMS log database. After the contents of the failed message has been recovered from the logs, the logic attempts to put it again to the coupling facility.

Embodiments of the above described method for retrying PUT operation for messages are described in co-pending U.S. patent application Ser. No. and incorporated herein by reference.

IVE. Handling Protected Conversation Interrupted Before Phase Two of the Protected Conversation Transaction The procedure that handles protected conversations interrupted before phase two of the commit procedure will be described below with reference to the attached drawings.

After IMS is restarted and the commit procedure reaches phase two, the protected resources participating in the commit vote to determine the status of the commit, see FIG. 1, blocks 1.02 and 1.04. If one or more protected resources cannot successfully finish the commit, the sync point manager decides to abort the commit procedure. In this case, the protected conversation unit of work element is built to include a recovery token and an abort indicator set, see block 1.03.

The recovery token defines the scope of the commit procedure specifying all the protected resources involved in the commit. In case all the participating resources can successfully finish the commit, the protected conversation UOWE is built having a commit indicator set, see block 1.05. The built scope protected conversation UOWEs are stored in the system private memory forming an UOWE request list.

Figure 2:
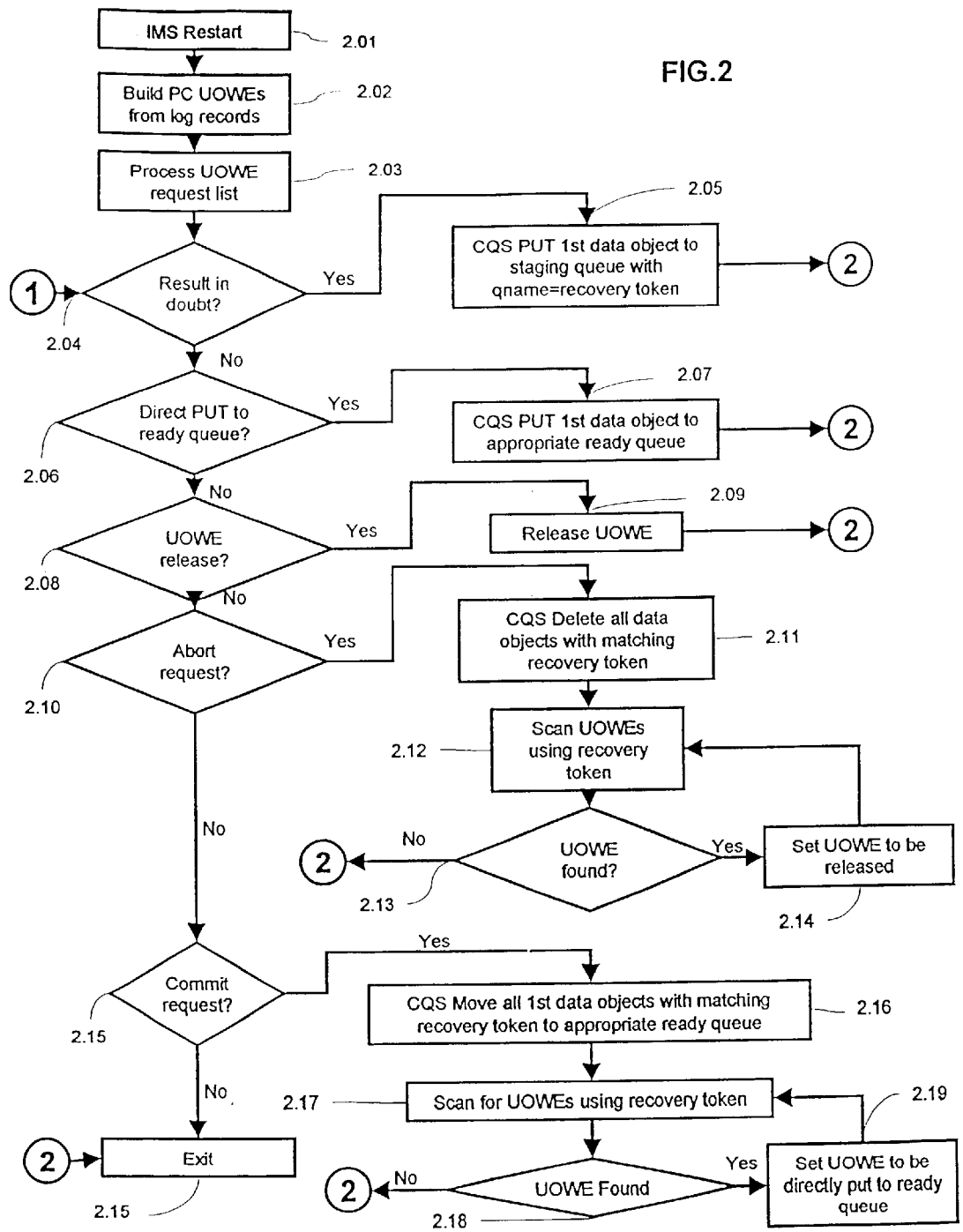
FIG. 2 illustrates the procedure for handling unit of work elements from the request list after IMS restart.

Alternatively, protected conversation unit of work elements request list may be built from the system log records after IMS restart, see FIG. 2, block 2.01 and FIG. 2.02.

The above request list is then processed element-by-element, see FIG. 2, block 2.03. In the next step, each UOWE is analyzed. If the status of the commit indicator corresponding to a given UOWE is in doubt, then the first data object corresponding to that UOWE is put to the staging queue, see FIG. 2, blocks 2.04 and 2.05. If the UOWE attributes indicate that the message is ready to be put in to the ready queue, then the first data object corresponding to that UOWE is put to the ready queue, see FIG. 2, blocks 2.06 and 2.07. If the UOWE attributes indicate that it is ready to be released, the system releases the UOWE, and corresponding entry is removed from the request list, see FIG. 2, blocks 2.08 and 2.09. If the UOWE contains the commit indicator, the system moves all data objects under the same commit scope designated by the recovery token into the ready queue and scans UOWEs using the recovery token, see FIG. 2, blocks 2.15–19. If any UOWEs with matching recovery tokens are found, they are also put into the ready queue. Finally, if the UOWE contains the abort indicator, the system deletes all data objects under the same commit scope, which is determined by the recovery token, see FIG. 2, blocks 2.10–14.

Distributed computer systems with means to perform the above-described methods and computer program products with computer readable code that enable a computer to perform these methods are all within the scope of the present invention.

Described above are the embodiments of the present inventions. It will be apparent to a skilled artisan that numerous modifications can be made thereto without deviating from the spirit of the invention.

What is claimed is:

1. A distributed computer system comprising:
   a plurality of execution environments; and
   a coupling facility,
   wherein each of said plurality of execution environments comprises a private storage memory for storing unit of work elements and a log data set for logging data related to the activity of each of said execution environments; and said coupling facility further comprises a staging queue for storing messages that are not ready to be committed and a ready queue for storing messages that are ready to be committed.

2. The distributed computer system of claim 1 wherein each of said stored unit of work elements comprises a recovery token containing information on all resources participating in a commit procedure.

3. The distributed computer system of claim 1 wherein each of said stored unit of work elements has an abort indicator, wherein the abort indicator indicates that a corresponding commit procedure is designated for abort when the abort indicator is set.

4. The distributed computer system of claim 1 wherein each of said stored unit of work elements has an abort indicator, wherein the abort indicator indicates that a corresponding abort procedure is designated for abort when the abort indicator is set.

5. The distributed computer system of claim 1 wherein each of said plurality of execution environments further comprises a retry logic, wherein said retry logic can be used to store unit of work elements and further said retry logic can be used for retrying putting messages corresponding to each of said stored unit of work elements to said coupling facility.

6. A distributed computer system wherein a protected conversation can be recovered after failure of an IMS system before phase two of a commit procedure, said system comprising:

a restarting means for restarting the IMS system;

a retry logic means for using retry logic to put all IMS messages out to a coupling facility such that a first message segment corresponding to each of said IMS messages is put on a staging queue using recovery token as a queue name;

a voting means to select one of aborting and committing said IMS messages;

a deleting means to deleting all messages under a same commit scope as identified by a recovery token if aborting has been selected; and a moving means for moving the first segment corresponding to each of said IMS under a same commit scope to a ready queue under its actual queue name if commit has been determined.

7. A method for recovering a protected conversation after failure of an IMS system before phase two of a commit procedure, comprising:

(a) restarting the IMS system;

(b) using retry logic to put all IMS messages out to a coupling facility such that a first message segment corresponding to each of said IMS messages is put on a staging queue using recovery token as a queue name;

(c) voting to select one of aborting and committing said IMS messages;

(d) deleting all messages under a same commit scope as identified by a recovery token if aborting has been selected in said step (c); and (e) moving the first segment corresponding to each of said IMS under a same commit scope to a ready queue under its actual queue name if commit has been determined in said step (c).

8. The method according to claim 7 wherein step (d) further comprises:

(i) deleting all data objects with a matching recovery token;

(ii) scanning for a unit of work element using the recovery token; and (iii) setting said unit of work element to be released if said unit of work element is found.

9. The method according to claim 7 wherein step (e) further comprises:

(i) moving all data objects with a matching recovery token to appropriate ready queue;

(ii) scanning for a unit of work elements using the recovery token; and (iii) setting said unit of work element such that the message to be PUT directly to appropriate ready queue if said unit of work element is found.

10. A computer program product for recovering a protected conversation after failure of an IMS system before phase two of a commit procedure in a distributed computer system, the computer program product including a computer readable medium comprising:

a computer readable restart code;

a computer readable retry code;

a computer readable voting code;

a computer readable deleting code; and a computer readable moving code, wherein the restarting code restarts the IMS system;

wherein the retry code uses retry logic to put all IMS messages out to a coupling facility such that a first message segment corresponding to each of said IMS messages is put on a staging queue using recovery token as a queue name;

wherein the voting code to selects one of aborting and committing said IMS messages;

wherein the deleting code to deletes all messages under a same commit scope as identified by a recovery token if aborting has been selected; and wherein the moving code moves the first segment corresponding to each of said IMS under a same commit scope to a ready queue under its actual queue name if commit has been determined.

* * * * *